Dec. 15, 1970  M. NUSSBAUM ET AL  3,546,924
DEVICE FOR LOCATING BOUNDARIES OF NON-HOMOGENEOUS BODIES
Filed Dec. 5, 1967

INVENTOR.
MARCEL NUSSBAUM
WILFRIED KUHL
BENNO LUX
BY

United States Patent Office 3,546,924
Patented Dec. 15, 1970

3,546,924
DEVICE FOR LOCATING BOUNDARIES OF NON-HOMOGENEOUS BODIES
Marcel Nussbaum, Wilfried Kurz, and Benno Lux, Geneva, Switzerland, assignors to Concast AG, Zurich, Switzerland
Filed Dec. 5, 1967, Ser. No. 688,146
Claims priority, application Switzerland, Dec. 13, 1966, 17,769/66
Int. Cl. G01n 29/00
U.S. Cl. 73—67.7
7 Claims

ABSTRACT OF THE DISCLOSURE

A sonic device for determining the location of the boundary line substances of different density, for example, for determining the phase boundary (solid-liquid) in a continuous casting operation, includes a transmitter and receiver having oscillators and arranged in a body in a manner such that they are separated electrically and acoustically and are arranged at an angle relative to each other and directed to transmit a sound pulse from the transmitter to an object to be measured so that the echo therefrom will be picked up by the receiver. The body is arranged so that it can be coupled or located in respect to the object to be measured over a liquid separation layer. The construction provides a sound head of high dynamics by arranging the transmitter and receiver at an angle relative to each other in the coupling plane so that interfering wave portions interfere and extinguish each other at an optimum separating angle dependent upon frequency, distance between oscillators, sound beam angle, the shape of the oscillator, the path of travel and material through which the sound must travel.

SUMMARY OF THE INVENTION

The present device relates, in general, to a sound device for determining the location of the boundary between constituents of different densities and, in particular, to a new and useful device for determining the phase boundary (solid-liquid) in a continuous casting.

The present invention relates, in particular, to a device for locating non-homogeneous areas using an ultrasonic echo principle. Such devices are particularly applicable for determining the phase boundary (solid-liquid) in a continuous casting by using an oscillator or vibrator which acts as a transmitter which is arranged in a body so as to be electrically and acoustically separated from the receiver and, to be oriented at an angle in respect to the receiver. The oscillator of the invention is coupled with the piece to be measured through a liquid.

Prior to the present invention, it has been proposed to use a S-E sound head wherein the beam angles of the oscillators of such head are adjustable for the purpose of determining a phase boundary of a solid-liquid. In doing this, it has been found that a disadvantageous background noise level interference background occurs which is caused by waves, which run along the surface, that is, on the one side surface waves and on the opposite side marginal rays of the sound field. This interfering background has such an amplitude that the reflections at weakly reflecting non-homogeneous areas at low depths are covered. The phase boundary of a solid-liquid in metals must be considered as a small non-homogeneous area, since the difference in sound resistance of the two phases is relatively small. Because of the geometric configuration of the metal body, the phase boundary reflects weakly and sound impulses are strongly dampened in hot metals.

In accordance with the present invention, the interfering background relative to the echo of the phase boundary (solid-liquid) is decreased and a sound head of high dynamics is produced. This is achieved by arranging the transmitter and receiver in a body such that they are disposed at an angle relative to each other in the coupling plane. The separating angle between the transmitter and the receiver measured in a plane parallel to the coupling plane is chosen so that the interfering wave portions which cause the background noise level extinguish each other by the interference phenomena. The most desirable separating angle is dependent upon the frequency, the average distance between the oscillators and the beam of the oscillators, the shape of the oscillator, the path of travel, the material of the body, the material to be sounded and the coupling liquid. The optimum separating angle must therefore be ascertained in dependence upon these parameters.

Accordingly, it is an object of the invention to provide an improved sound device for determining the location of a boundary line between substances of different densities and, in particular, for determining the phase separation (solid-liquid) in a continuous casting and, which is of high dynamics.

A further object of the invention is to provide a sound device which includes a transmitter and a receiver oriented obliquely in a body of a material such as a plastic which is adapted to be coupled to a body to be tested over a liquid layer and, wherein the transmitter and receiver are arranged at an optimum angle in respect to each other seletced to provide a high dynamic arrangement and, wherein the body preferably includes an acoustic separating wall between the transmitter and receiver and means for directing the liquid from the exterior of the body to a location of the surface of the body so that it may be positioned on a liquid layer over the body to be tested.

A further object of the invention is to provide a sound device for determining phase difference in a continuous casting which is simple in design, rugged in construction and economical to manufacture.

The various features of novelty which characterize the invention are pointed out with particularly in the claims annexed to and forming a part of this sepcification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
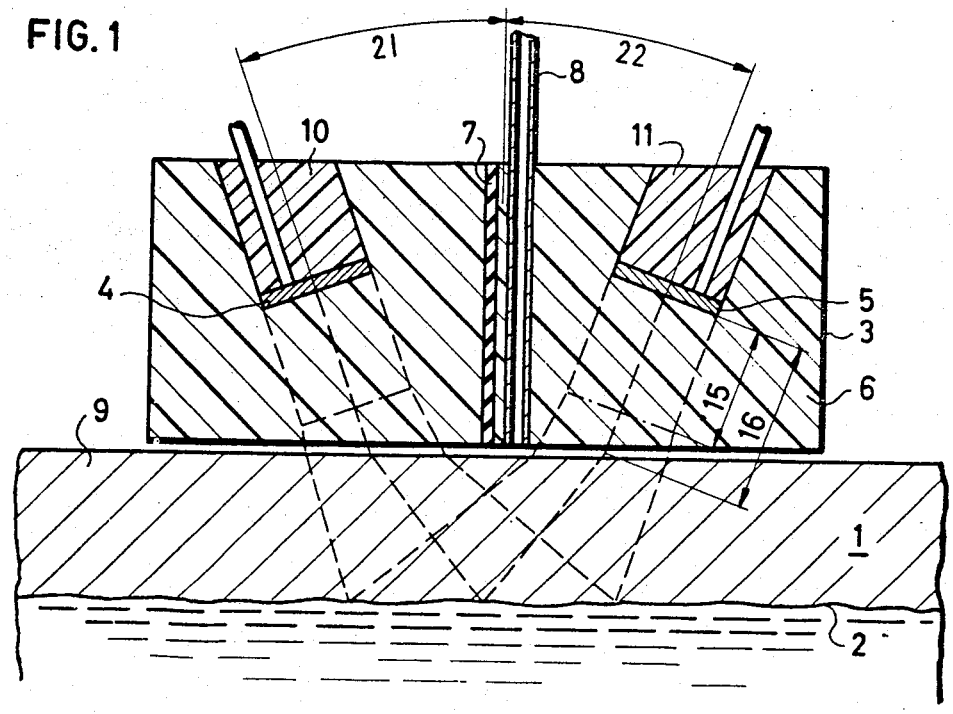
FIG. 1 is a transverse sectional view taken along the lines I—I of FIG. 2 of a sound device for determining the location of the phase change in a continuous casting.

Referring to the drawings, in particular, the invention embodied therein comprises a sound device which is adapted to be used for determining the location of a boundary line 2 between the phases (liquid-solid) of a continuous casting body 1. In accordance with the invention, the sound device includes a sound head 3 having oscillators of a piezo-electric material including a transmitter 4 and a receiver 5 which are contained within the body 6. The body 6 serves for the transmission of sound waves from the transmitter 4 to the measuring object 1 and from the measuring object 1 to the receiver 5. As a material for the body 6, it is preferable to employ a plastic, for example, Araldite. In some instances, it is desirable to form the body 6 as a container which is filled with a liquid providing a pre-running material which is chosen to have such a sound resistance that the transmission losses from the sound head 3 to the testing object 1 are as low as possible in order to obtain an optimum coupling.

In order to separate the transmitter 4 and the receiver 5 in an acoustical manner, there is provided an acoustic separating wall 7 of a sound dampening material, for example, of cork. A connecting conduit or pipe 8 is built into the pre-running body and is arranged to supply water so that it fills the space between the body 3 and the object 1 to be tested.

In order to produce pulses which are as short as possible, that is, which are poor in interference, the oscillators are imbedded in damping bodies 10 and 11 on the rearward side or the side which faces away from the coupling plane 9. In order to obtain as high as damping of the oscillators as possible, the damping bodies 10 and 11 are, for example, produced from a mixture of Araldite, tungsten and rubber powder.

In order to obtain a high dynamic response, the geometry of the sound head 3 is of decisive influence. The following concepts are covered by the geometry: the length of the running bodies, that is, the body 6, the distance between separating walls and its opposing boundary surface, the average distance between the oscillators of the transmitter 4 and the receiver 5, the separating angle between the transmitter and the receiver and the incoming beam angle.

Figure 2:
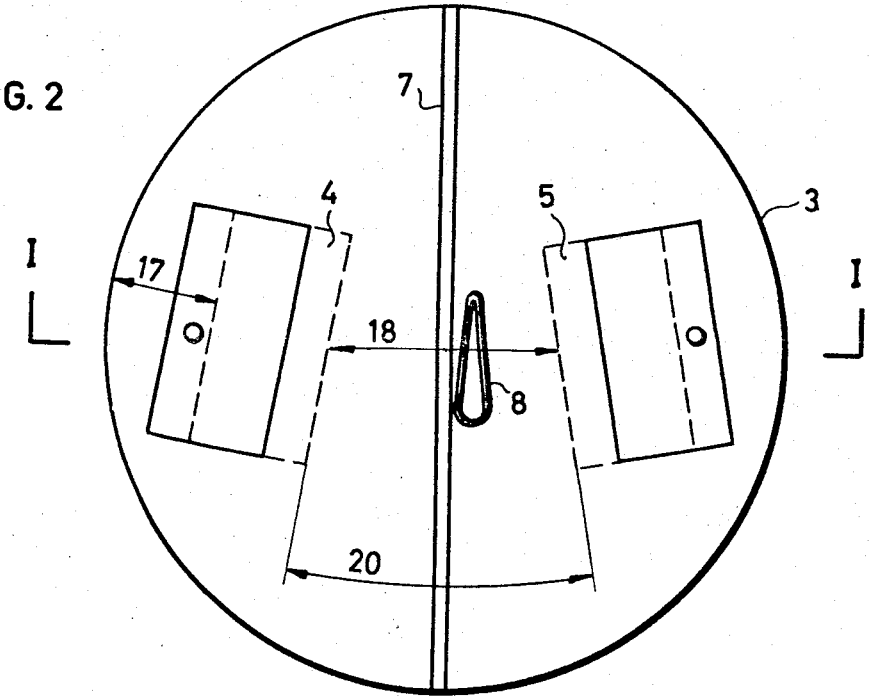
FIG. 2 is a top plan view of the sound device indicated in FIG. 1.

As shown in FIG. 1, the average length from the receiver (or transmitter) through the pre-running body 6 should not coincide with the near field length 15 in order not to negatively effect the dynamic response. It has been shown that the distributing or interference background can be further diminished by different lengths 15 and 16 from the transmitter 4 and the receiver 5. The distance 17 measured in FIG. 2 from the end of the body 6 to the edge of the transmitter 4 should exceed the length of the oscillator and should be large enough in order to weaken the disturbing effects of the reflections of the marginal rays of the sound field and therefore cause an increase of the dynamic. The mean or average distance 18 between the transmitter 4 and the receiver 5 should be as small as possible because it has been ascertained that larger distances increase the interfering background. It may, for example, amount to 20 mm. Of decisive importance for a high dynamic response, however, is an angular arrangement of the oscillators of the transmitter 4 and the receiver 5 in the coupling plane. The separating angle 20, as measured in FIG. 2, is dependent on many factors and may amount to from between 5 and 40°. Large separating angles 20 may, however, cause an enlargement of the average distance 18. In order to decrease this average distance, the facing sides of the oscillators may be formed V-shaped, tooth-shaped and the like.

The incoming beam angles for the transmitter and the receiver 5 are measured from normals to the coupling plane to the axis of the respective transmitter and receiver and, are indicated at 21 and 22 in FIG. 1. These angles 21 and 22 are determined by the spatial separation of the transmitter 4 and the receiver 5. The beam angles 21 and 22 are adjusted for the desired testing depth to produce maximum reflection. The incoming beam angle amounts, for example, to 3° in a sounding head with an Araldite pre-running body 6 and a measuring body of steel with a phase boundary of 5:10 cm. depth. For testing pieces of lower thickness, this angle may amount up to 30°.

The main sounding emitting and sound receiving faces of the transmitter 4 and receiver 5 are not round and have an axially asymmetrical sonic directivity characteristic.

The inventive device is not limited to the particular arrangement described herein. Such devices may be used for determining the phase boundary but also, for example, to determine non-homogeneous areas of heat metal or solidified bars or pieces. In addition, for example, a separating and incoming beam angles may be changed.

While a specific embodiment of the invention has been shown and described in detail to illustrate the application of the inventive principles, it will be understood that the invention may be embodied otherwise without departing from such principles.

What is claimed is:
1. A device for determining the location of non-homogeneous areas according to the ultrasonic echo principle, particularly for the determination of the solid-liquid phase boundary in a continuous casting, comprising a body, transmitter and receiver oscillators arranged in said body and separated electrically and acoustically from each other, said body defining a coupling plane adjacent one side which is adapted to be oriented in respect to an article to be tested, said oscillators each having main sound emitting and sound receiving faces and producing a sound ray directivity characteristic which is not symmetrical in respect to its axis, the incidence axis of each of said oscillators in respect to a normal to said coupling plane each forming a beam angle, and means for supplying liquid to the coupling plane of said body, said transmitter and said receiver oscillators beeing arranged in said body at a selected separating angle relative to each other of from between 3 degrees to 40 degrees measured in a plane parallel to the coupling plane selected so as to substantially eliminate background noise by interference.

2. A device, according to claim 1, wherein the average distance measured between said transmitter and said receiver along the length thereof is less than 20 mm.

3. A device, according to claim 1, including an acoustic separating wall disposed in said body between said transmitter and said receiver, said body extending beyond said transmitter and said receiver on the side opposite from said separating wall so that interfering effects of the reflection of marginal rays of the sound field are weakened.

4. A device, according to claim 1, wherein said body comprises a material having high sound transmittance.

5. A device, according to claim 1, wherein said transmitter and receiver oscillators are provided with damping bodies on the side which faces away from the coupling plane.

6. A device according to claim 1, wherein said beam angle of each of said oscillators is equal to or less than 30°.

7. A device according to claim 1, wherein the average lengths between respective said sound emitting and sound receiving faces of said oscillators from said coupling plane are different from the near field length of the associated transmitter and receiver oscillators.

References Cited
UNITED STATES PATENTS

| | | | |
|---|---|---|---|
| 3,068,370 | 12/1962 | McInnish | 73—67.7X |
| 3,228,232 | 1/1966 | Proctor | 73—67.7 |
| 3,237,251 | 3/1966 | Thalmann | 73—67.5UX |
| 3,251,220 | 5/1966 | Joy | 73—67.7 |
| 3,320,797 | 5/1967 | Tajiri et al. | 73—67.7 |
| 3,325,781 | 6/1967 | Harris | 73—67.7X |

FOREIGN PATENTS

| | | | |
|---|---|---|---|
| 953,167 | 3/1964 | Great Britain | 73—71.5 |

JAMES J. GILL, Primary Examiner